(12) United States Patent
Talbot et al.

(10) Patent No.: US 7,373,769 B2
(45) Date of Patent: May 20, 2008

(54) WEAR SHIELD FOR THE CUTTER BAR OF A CROP CUTTING MACHINE

(75) Inventors: Francois R. Talbot, Winnipeg (CA); Daniel G. Cormier, Oak Bluff (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 107 days.

(21) Appl. No.: 11/043,425

(22) Filed: Jan. 27, 2005

(65) Prior Publication Data

US 2006/0162311 A1 Jul. 27, 2006

(51) Int. Cl.
*A01D 34/13* (2006.01)
(52) U.S. Cl. .......................................... 56/303; 56/296
(58) Field of Classification Search .................. 56/257, 56/296, 298, 299, 303, 307–311, 264, 119, 56/208, DIG. 17
See application file for complete search history.

(56) References Cited

U.S. PATENT DOCUMENTS

| | | | | |
|---|---|---|---|---|
| 2,375,849 A * | 5/1945 | Hume | .......................... | 56/303 |
| 4,199,925 A * | 4/1980 | Quick et al. | ................... | 56/208 |
| 4,573,308 A * | 3/1986 | Ehrecke et al. | .............. | 56/14.4 |
| 4,660,360 A * | 4/1987 | Hardesty et al. | ............... | 56/208 |
| 4,660,361 A * | 4/1987 | Remillard et al. | ............. | 56/297 |
| 4,729,212 A * | 3/1988 | Rabitsch | ....................... | 56/119 |
| 5,012,635 A * | 5/1991 | Walters et al. | ............... | 56/13.6 |
| 5,174,101 A * | 12/1992 | Rabitsch | ...................... | 56/17.4 |
| 5,924,270 A * | 7/1999 | Bruns | ......................... | 56/320.1 |
| D454,576 S | 3/2002 | Huntimer | | |
| 6,675,568 B2 * | 1/2004 | Patterson et al. | ............. | 56/208 |
| 6,962,040 B2 * | 11/2005 | Talbot | .......................... | 56/297 |
| 2003/0010010 A1 * | 1/2003 | Buermann | .................... | 56/257 |

* cited by examiner

*Primary Examiner*—Thomas B Will
*Assistant Examiner*—Jamie L McGowan
(74) *Attorney, Agent, or Firm*—Adrian D. Battison; Michael R. Williams; Ryan W. Dupuis (57) ABSTRACT

A wear shield is attached to a cutter bar and is formed from a molded wear body having a front mounting portion bolted onto the guards of the cutter bar by the guard mounting bolts with recesses for the guard fingers and a front edge of an upper planar mounting surface clamped onto the guard bar. A rear covering portion is cantilevered rearwardly from the front mounting portion underlying a bottom plate of the cutter bar for engaging the ground so as to underlie and protect the bottom plate. Resilience in the wear shield forces the rear part against the bottom plate of the cutter bar to avoid the necessity for a rear fastener. A series of the wear shields is arranged side by side across the cutter bar with two side edges each for locating adjacent a side edge of a next adjacent wear shield.

27 Claims, 8 Drawing Sheets

WEAR SHIELD FOR THE CUTTER BAR OF A CROP CUTTING MACHINE

This invention relates to a wear shield for the cutter bar of a crop harvesting machine where the cutter bar includes a guard bar mounted on a front edge of the cutter bar, a plurality of cutter guards carried on mounting bolts at spaced positions along the guard bar and a ground engaging bottom plate on the cutter bar extending rearwardly from the guard bar.

BACKGROUND OF THE INVENTION

The above type of cutter bar is well known and widely used in crop harvesting machines of the sickle knife type in which a knife is carried on the guards and reciprocates across the guards in a cutting action.

For some crops, the cutter bar is carried so that it skids over the ground with much of the weight of the header carried on springs but a small amount of the weight applied through the cutter bar onto the ground to hold the cutter bar against the ground in a skidding action to provide the cutting action at the lowest possible position relative to the ground.

It is well known that wear shields are mounted on the cutter bar at the position where the cutter bar contacts the ground so as to reduce the frictional wear on the cutter bar itself and to apply it instead to a replaceable plastic wear piece which can be removed when worn and replaced by a new wear piece.

Commonly such shields are bolted onto the bottom plate of the cutter bar simply by bolting through the shield into the bottom plate behind the guard bar of the cutter bar.

Examples are shown in U.S. Pat. No. 5,924,270 (Bruns) assigned to May-Wes Manufacturing Inc. and issued Jul. 20, 1999, U.S. Pat. No. 5,174,101 (Rabitsch) issued Dec. 29, 1992 and Design patent D454,576 (Huntimer) assigned to Global Polymer Industries Inc. and issued Mar. 19, 2002. All these patents show basically the same arrangement in which a sheet of plastic material is simply bolted to the underside of the bottom plate by front and rear fasteners.

SUMMARY OF THE INVENTION

It is one object of the invention to provide an improved wear shield of this type.

According to one aspect of the invention there is provided a wear shield for attachment to a header of a crop cutting machine having a cutter bar, a guard bar mounted on a front edge of the cutter bar, a plurality of cutter guards carried on mounting bolts at spaced positions along the guard bar and a ground engaging bottom plate on the cutter bar extending rearwardly from the guard bar;

the wear shield comprising:

a molded wear body having a front mounting portion and a rear covering portion;

the front mounting portion having at least one mounting hole arranged to engage a mounting bolt of a respective one of the guards;

the rear covering portion being arranged to extend rearwardly from the front mounting portion and having a bottom surface arranged for engaging the ground so as to underlie and protect the bottom plate;

the front mounting portion and the rear covering portion having two side edges each for locating alongside a next adjacent wear shield so that the wear shields can be arranged side by side across the cutter bar.

The wear shield may be arranged to be mounted on a single cutter guard or may be longer so as to bridge a number of such guards. The single mounting allows easier removal and mounting simply by removing the guard bolts.

Preferably the front mounting portion has at least one recess therein arranged to receive a portion of a respective one of the guards therein. This may be provided by two such recesses side by side for the double fingers of the common guard arrangement, but a single recess may also be used.

Preferably the front mounting portion has upper surface portions arranged to lie in a common plane so as in use to butt against a bottom surface of the guard bar.

Preferably the wear shield is resilient and a part or parts are arranged as interference fit with the cutter bar such that when bolted onto the guard bar at least a rear edge of the upper surface portion is pressed by its own resilience causing spring loading against the bottom plate of the guard bar to avoid flapping and to reduce the possibility of entry therebetween of soil. This avoids the necessity for a rear fastener or clip.

Preferably the front mounting portion has at least one recess therein arranged to receive a portion of a respective one of the guards therein and wherein the recess has a bottom surface portion arranged to butt against a bottom surface of the portion of the respective one of the guards.

Preferably the front mounting portion has two recesses therein each arranged for receiving a respective one of two guard fingers of the respective one of the guards, two side pieces each extending outwardly to a respective side of a respective one of the recesses and a center piece between the two recesses, wherein the center piece includes a front recess section extending thereacross for receiving a center bar of the guard.

Preferably the rear covering portion is cantilevered from the front mounting portion so that the molded wear body is only supported at the front mounting portion by the mounting bolt.

Preferably the rear covering portion includes an upper surface for engaging the bottom plate and wherein the upper surface includes a plurality of upwardly extending ribs defining an upper surface of the ribs for engaging the cutter bar rearwardly of the guard bar.

Preferably the front mounting portion has a front edge arranged to extend along a front edge of the guard bar substantially coincident therewith.

Preferably the mounting bolt includes a first shoulder for engaging a bottom surface of the cutter guard and a second shoulder axially spaced from the first for engaging a bottom surface of the wear shield.

According to a second aspect of the invention there is provided a wear shield comprising:

a molded wear body having a front mounting portion and a rear covering portion;

the front mounting portion having at least one mounting hole;

the rear covering portion being arranged to extend rearwardly from the front mounting portion and having a bottom surface arranged for engaging the ground;

the front mounting portion and the rear covering portion having two side edges each for locating alongside a side edge of a next adjacent wear shield so that the wear shields can be arranged side by side across the cutter bar;

wherein the front mounting portion has at least one recess therein arranged to receive a portion of a respective one of the guards therein; and wherein the front mounting portion has upper surface portions arranged to lie in a common plane for engaging a bottom surface of the guard bar.

According to a third aspect of the invention there is provided a cutter apparatus of a crop cutting machine comprising:

a cutter bar, a guard bar mounted on a front edge of the cutter bar, a plurality of cutter guards carried on mounting bolts at spaced positions along the guard bar;

a ground engaging bottom plate on the cutter bar extending rearwardly from the guard bar;

and a wear shield for covering the bottom plate comprising:

a molded wear body having a front mounting portion and a rear covering portion;

the front mounting portion having at least one mounting hole engaging a mounting bolt of a respective one of the guards;

the rear covering portion being arranged to extend rearwardly from the front mounting portion and having a bottom surface for engaging the ground so as to underlie and protect the bottom plate;

the front mounting portion and the rear covering portion having two side edges each for locating alongside a side edge of a next adjacent wear shield so that the wear shields can be arranged side by side across the cutter bar.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

A cutter bar is generally indicated at 10 for use with a crop cutting machine. The cutter bar itself is of a generally conventional construction including a generally C-shaped cutter bar 11 with a front edge 12 at which is mounted a guard bar 13. The guard bar defines a flange welded at the rear edge 14 to the front surface 12 and defining a front edge 15 and a top surface 16. A series of mounting holes 13A are formed through the guard bar for mounting at spaced positions along the length of the bar a plurality of guards 17.

Again the guards 17 are of a conventional construction including a pair of guard fingers 18 and 19 each of which defines a slot 20 through which the sickle knife passes, the sickle knife including a knife bar which is carried on a support surface 21 of the guard extending across between the two fingers and extending outwardly to each side to a side edge 22 of the bar.

Figure 6:
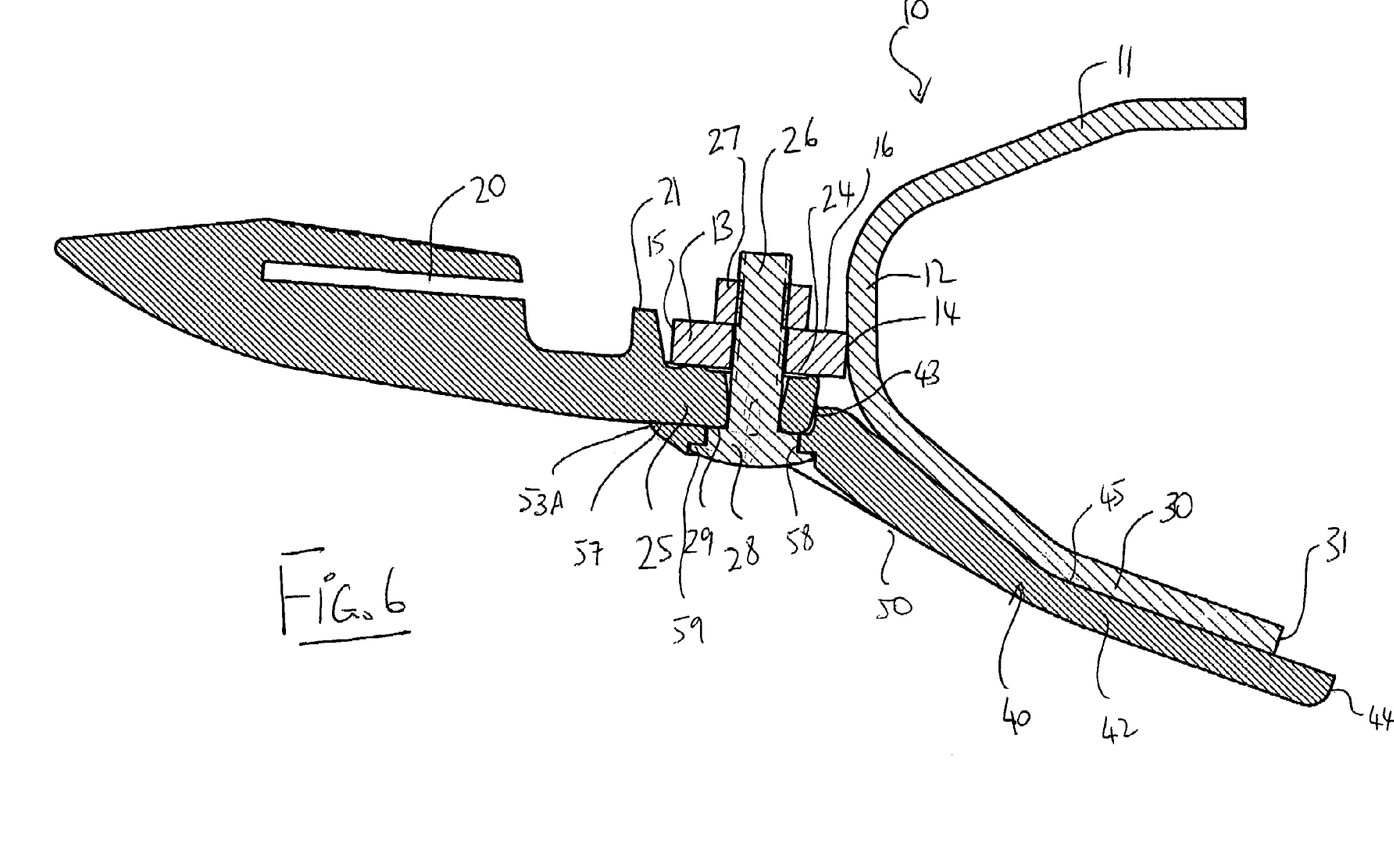
FIG. 6 is a cross sectional view along the lines 6-6 of FIG. 5.

At the rear of the fingers, each finger is mounted underneath the guard bar 13 so as to be bolted to a bottom surface 24 of the guard bar 13. Thus the rear end of each finger, as best shown in FIG. 6, includes a rearwardly projecting portion 25 which underlies the bottom surface 24 of the guard bar. The portion 25 has a width which is the same or basically the same as the width of the finger itself so that the portion 25 extends only under a part of the length of the guard bar with the remainder of the bottom surface 24 of the guard bar being exposed.

The portion 25 is clamped to the bottom surface 24 of the guard bar by a series of mounting bolts 26 each of which carries a nut 27 contacting the top surface 16. A head 28 on the underside has a shoulder 29 engaging the bottom surface of the portion 25 to vigorously clamp the guard finger up underneath the guard bar 13.

The cutter bar 11 includes a bottom plate 30 which extends downwardly and rearwardly from the front portion 12 to a rear edge 31. The bottom plate 30 thus is arranged below the guard bar 13 so that it contacts the ground and, when contacting the ground, supports the guards above the ground to carry the sickle knife above the ground in a cutting action.

A series of wear shields 40 are arranged side by side across the cutter bar so as to provide a wear surface underneath the portions 25, underneath the guard bar 13 and underneath the bottom plate 30.

The wear shields 40 in the embodiment shown are arranged so that they have a width generally equal to the width of an associated guard. However wear shields of a greater width can be manufactured so as to co-operate with a series of the guards. The single shield for each guard is selected for easier mounting since the wear shield can be removed and replaced simply by removing and replacing the associated one of the guards. Each wear shield 40 has a front mounting portion 41 and a rear covering portion 42. The front mounting portion 41 is arranged to be mounted at the guard plate. The rear covering portion extends rearwardly from a front edge 43 of the rear covering portion rearwardly and downwardly over the bottom plate 30 to a rear edge 44 of the rear covering portion. The rear covering portion 42 has an upper surface 45 generally shaped to follow the shape of the undersurface of the bottom plate 30. The surface 45 includes a flat rear portion 45A and a forward portion 45B. At the forward portion 45B is located a plurality of ribs 46 including five longitudinal ribs and two transverse ribs 47 and 48. The ribs thus define recesses 49 between the ribs. The wear shield is formed by moulding so that the presence of the recesses 49 reduces the quantity of material in the molding process so that the thickness of the wear shield excluding the ribs is substantially constant to provide a substantially constant wear thickness throughout the rear portion 42. The ribs however have an upper planar surface for butting against the outside surface of the plate 30 to hold the bottom surface of the wear shield indicated at 50 as a generally smooth surface extending from the underside of the guard bar 13 rearwardly to the rear edge 31 of the bottom plate.

The front mounting portion 41 includes a center mounting section 52, a first recess 53, a second recess 54 and two side mounting portions 55 and 56. The recesses 53 and 54 are shaped and arranged to receive the portions 25 of the guard underlying the bottom surface 24 of the guard bar. Thus the recesses extend into the body of the moulded structure forming the wear shield to a surface 57 at the bottom of the recess which is shaped and arranged to butt against the bottom surface of the portion 25 of the guard.

At the bottom of the recesses 53 and 54 is formed a hole 58 through which the shoulder 29 of the bolt 28 projects so that the shoulder 29 can butt against the bottom surface of the portion 25 without engaging the front portion 41 of the wear shield 40.

Figure 1:
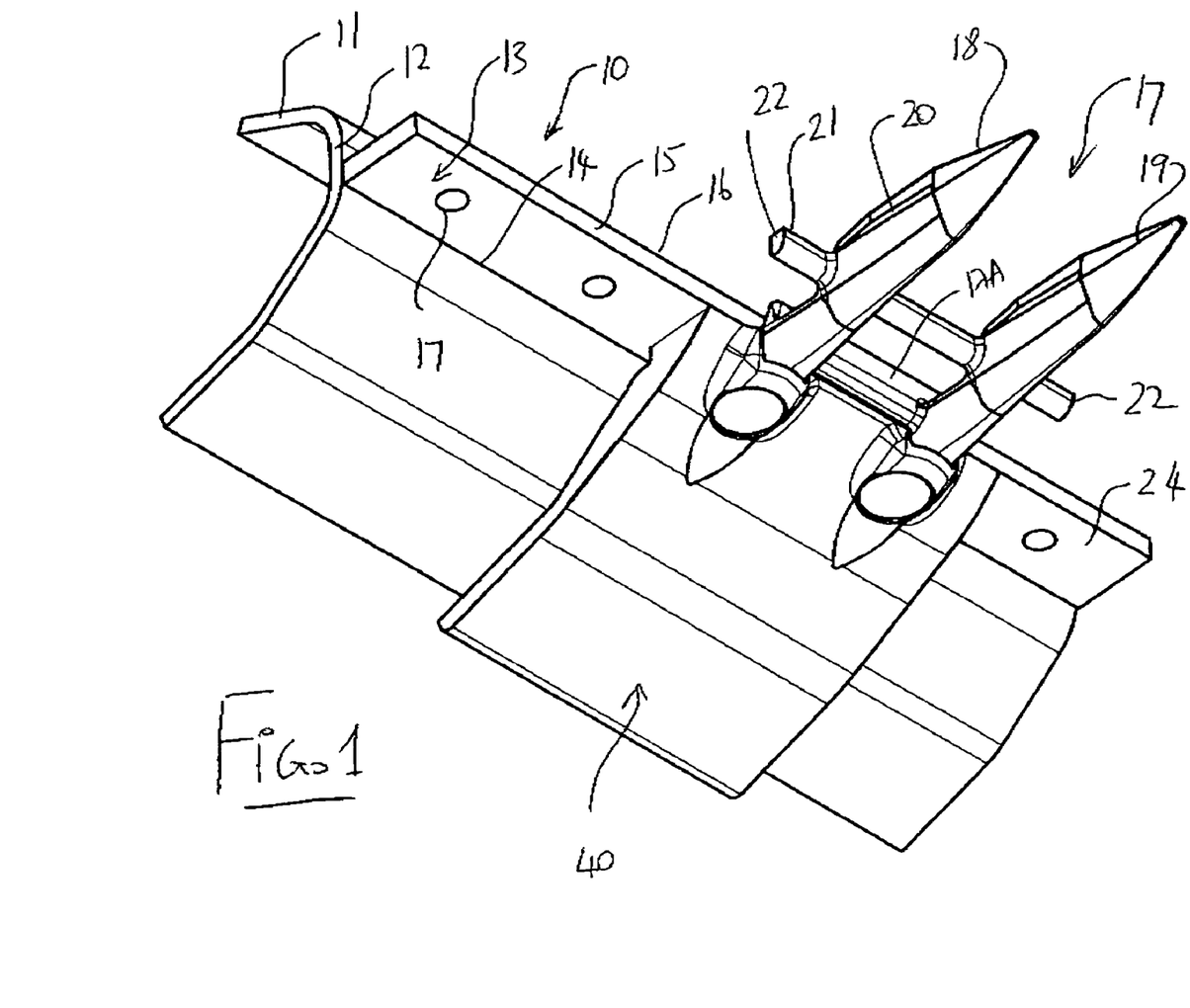
FIG. 1 is an isometric view from the underside showing the cutter bar, guard bar and one guard of a crop harvesting machine together with one wear shield of a series of such wear shields according to the present invention.
Figure 2:
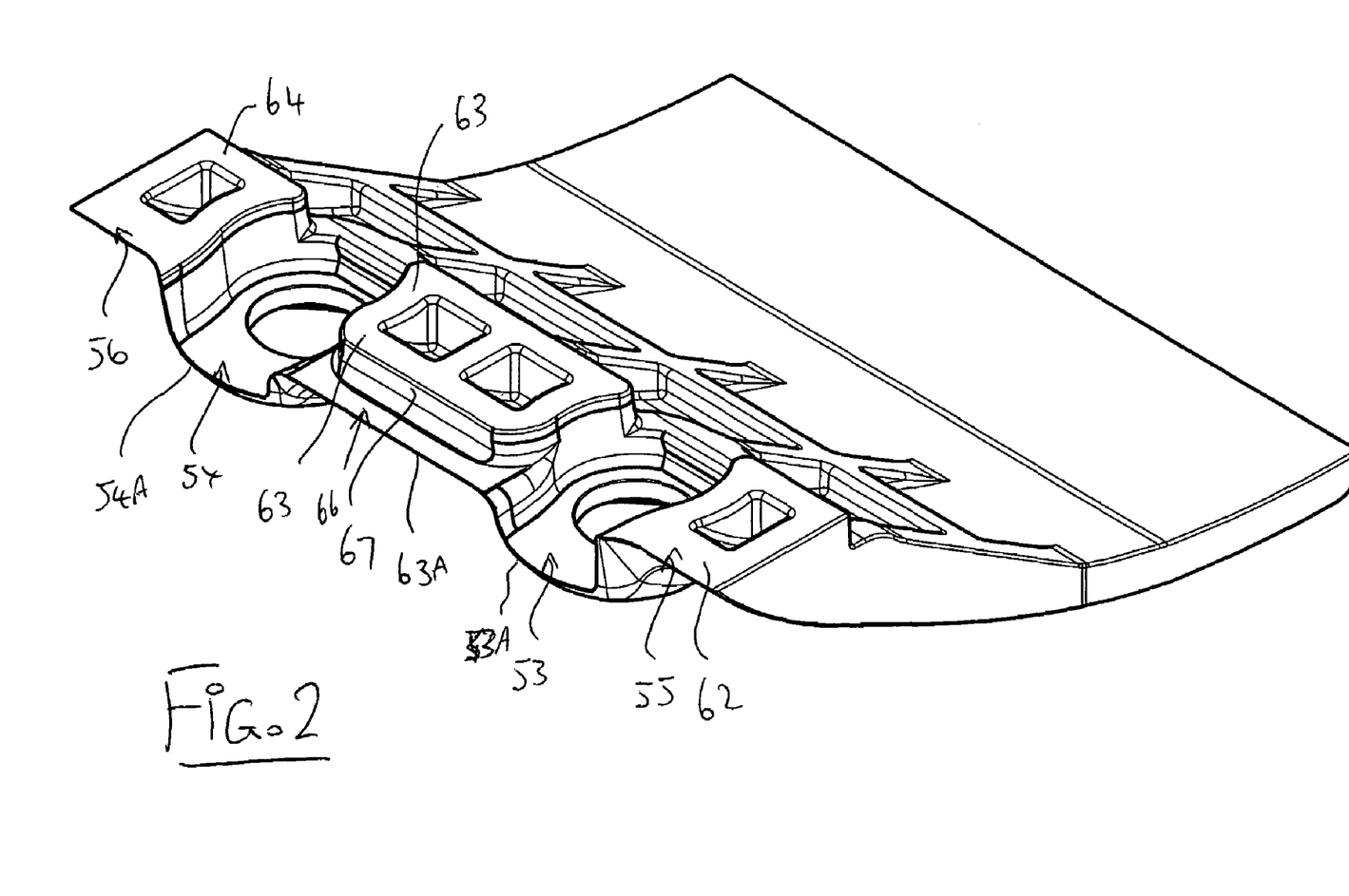
FIG. 2 is an isometric view from the top and one side of the wear shield only of FIG. 1.
Figure 3:
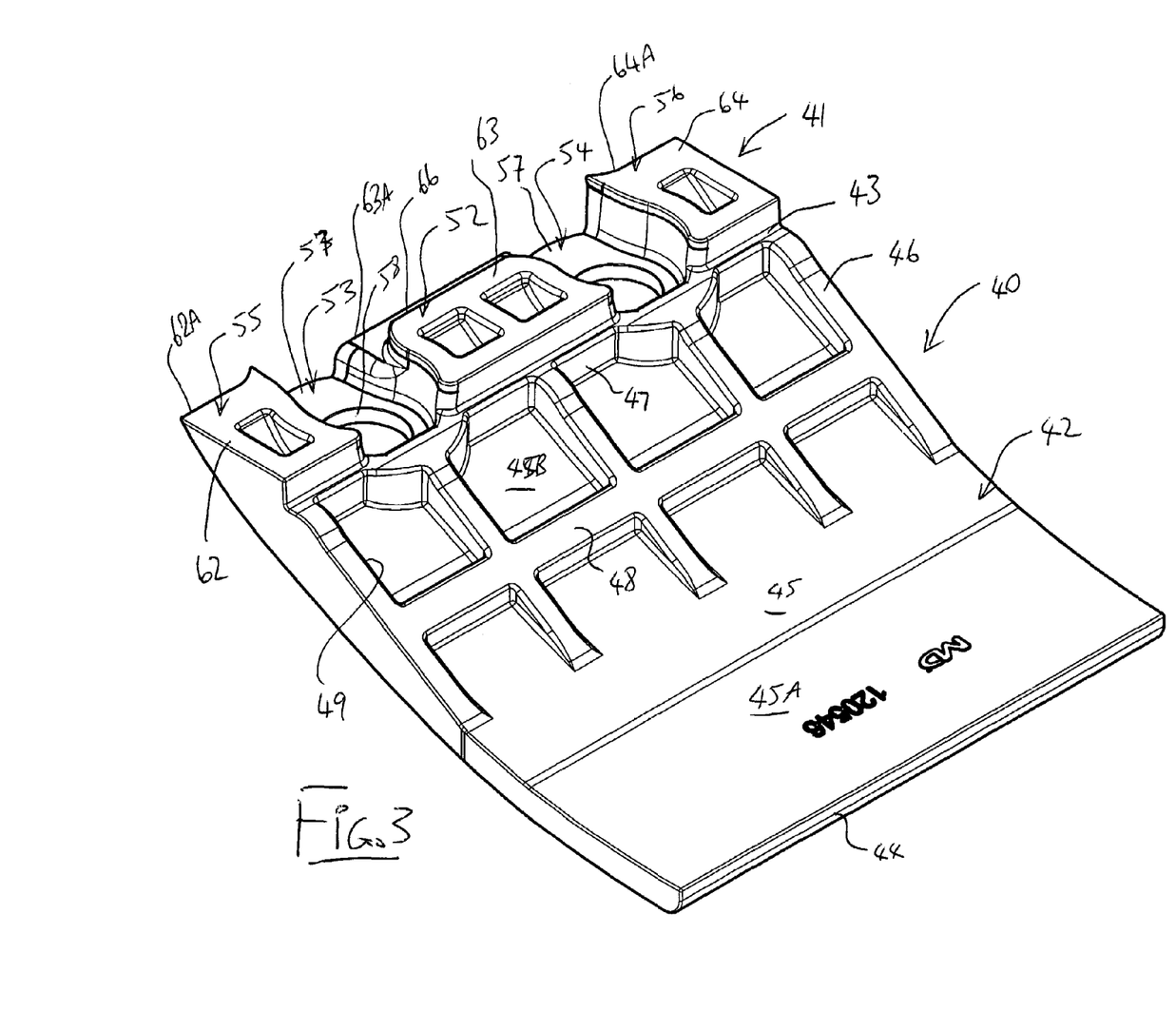
FIG. 3 is an isometric view from the top and rear of the wear shield of FIG. 1.
Figure 4:
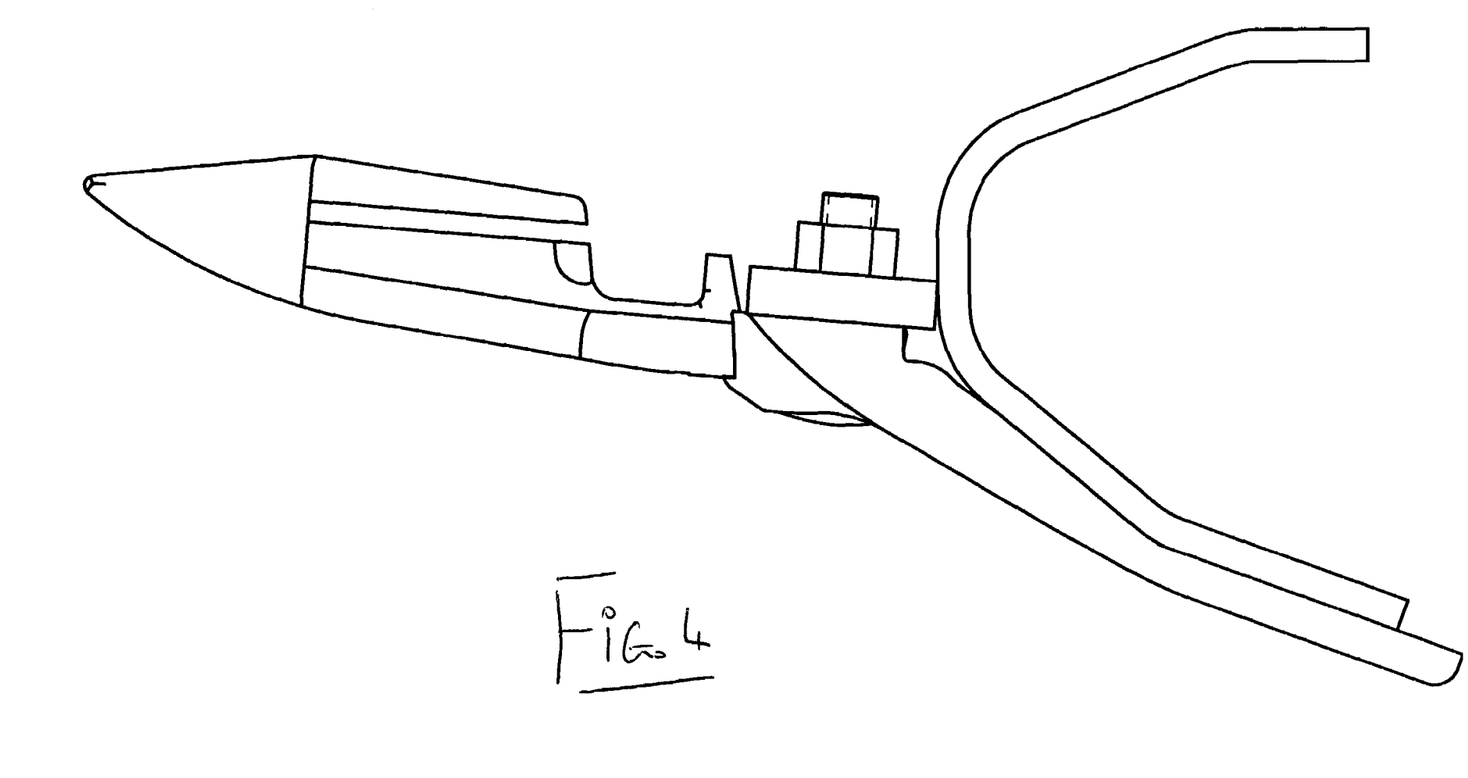
FIG. 4 is an end elevational view of the components of FIG. 1 including the wear shield.
Figure 5:
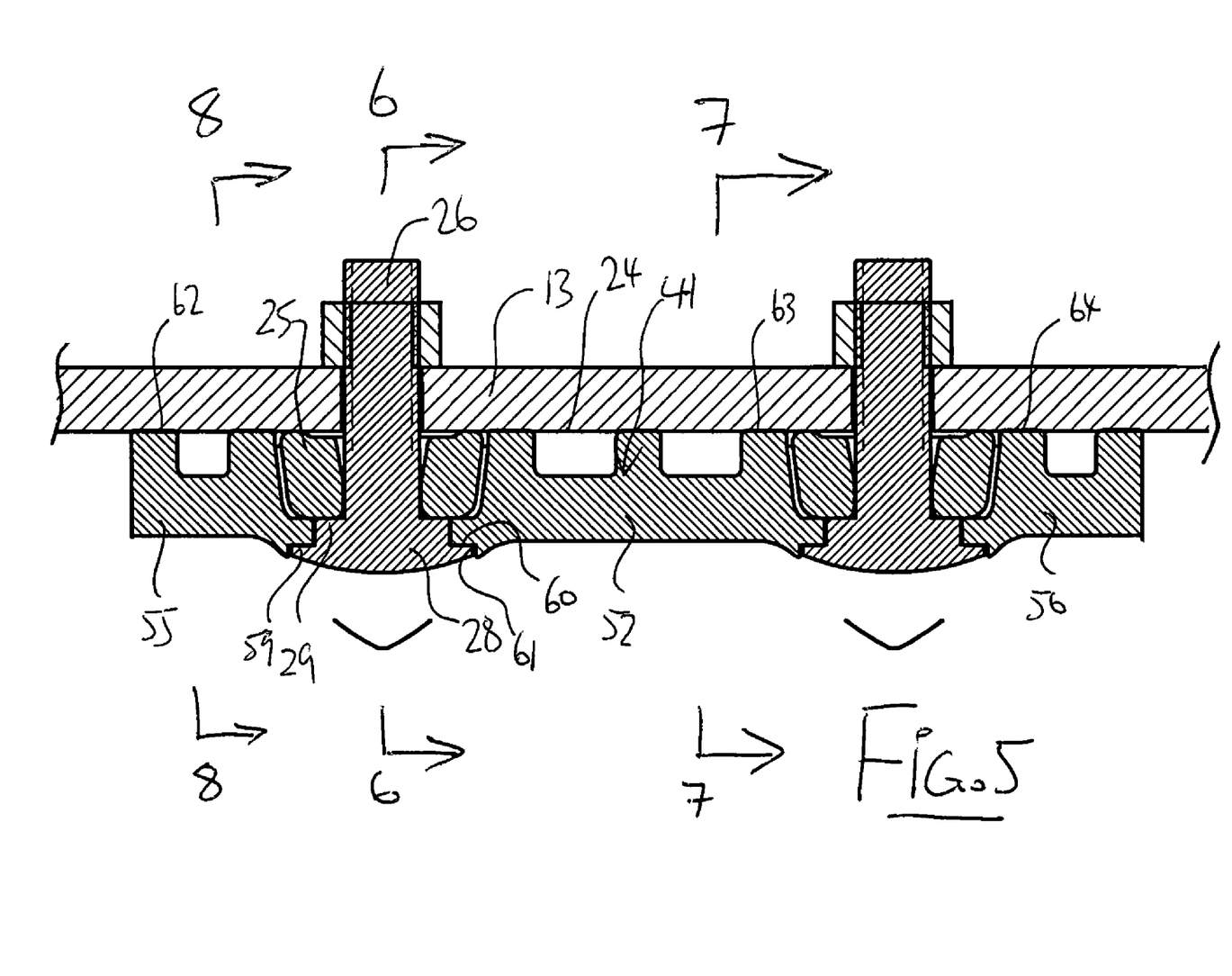
FIG. 5 is a cross sectional view along the lines 5-5 of FIG. 4.

From a review of FIGS. 5 and 6, it will be noted that the head 28 of the bolt 26 includes a second shoulder 59 outside the shoulder 29 and below the shoulder 29 which butts against the shoulder 60 of a recess 61 in the front portion 41. Thus the double shoulder 29, 59 of the bolt 26 acts to hold both the bottom surface of the portion 25 against the guard bar 13 and also acts to hold the bottom portion of the front portion 41 against the underside of the portion 25 of the guard.

The center portion 52 and the side mounting portions 55 and 56 each define a butting surface 62, 63 and 64 for contacting the bottom surface 24 of the guard bar 13. These surfaces are coplanar so as to contact the planar surface 24.

Figure 8:
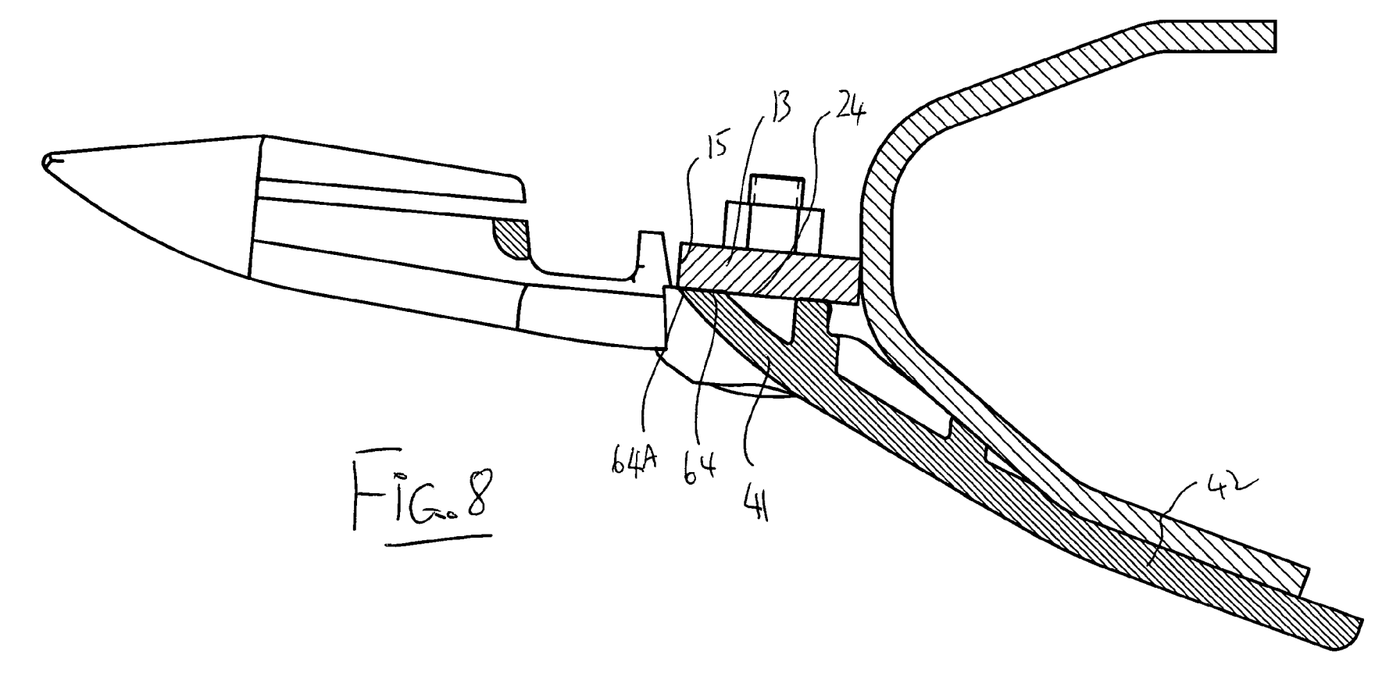
FIG. 8 is a cross sectional view along the lines 8-8 of FIG. 5.

The side mounting portions 55 and 56 each include a front edge of the respective surface indicated at 62A and 64A respectively. These edges 62A and 64A are arranged so as to be substantially coincident with the front face 15 of the guard bar 13. Thus as best shown in FIG. 8, the bottom surface of the front portion 41 of the wear shield curves forwardly and upwardly to the front edge 64A which meets the front edge 15 of the guard bar 13.

The moulding of the plastic material forming the wear shield is arranged so as to provide an interference fit of the edge 64A so that it is slightly larger than required and thus is slightly distorted by compression from the underside 24 of the guard bar 13 when the front portion 41 is clamped into place by the bolts 26. This provides a tight edge across the front of the wear shield and locates this front edge at the front edge of the guard bar so as to provide a generally smooth surface from the front edge of the guard bar rearwardly for contacting the ground and preventing the penetration and collection of soil from the ground.

Figure 7:
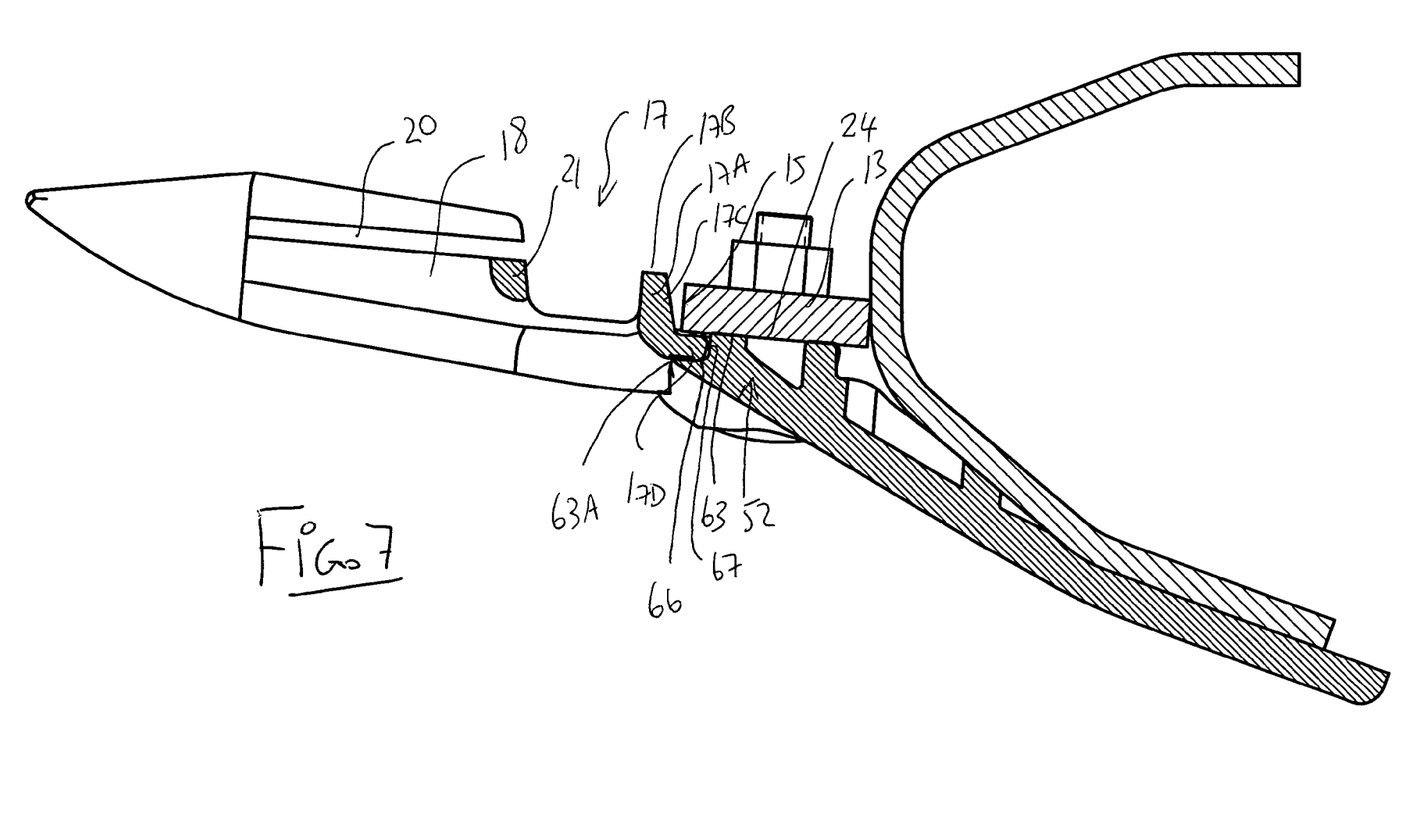
FIG. 7 is a cross sectional view along the lines 7-7 of FIG. 5.

As best shown in the cross section of FIG. 7, the guard 17 includes a cross bar 17A connecting the fingers rearwardly of the knife support bar 21. This provides an upper surface 17B which also provides support for the knife bar. The cross bar 17A includes a front portion 17C in front of the front edge 15 of the guard bar 13 and a rear portion 17D which extends downwardly and rearwardly to contact against the bottom surface 24 of the guard bar 13. Thus the cross bar 17A forms part of the clamping arrangement by which the guard is clamped underneath the guard bar. Thus the upper surface of the cross bar 17A at the portion 17D is coplanar with the top surface of the portion 25 at the rear of the respective guard finger.

The center mounting portion 52 has the coplanar surface 63 arranged to contact the underside of the guard bar. However the center portion is recessed as indicated at 66 across the front edge of the wear shield to receive the portion 17D of the cross bar 17A. Thus the center mounting portion 52 has a front edge 63A which is recessed from the surface 63 and butts against the bottom surface of the portion 17D of the cross bar 17A. A shoulder 67 of the recess 66 butts against a rear surface of the cross bar 17A.

The front portion is thus moulded so that it has sections underlying the guard at the rear part of the guard. Thus the front edge 63A in the center mounting section butts up against the underside of the cross bar 17A. Thus each of the recesses 53 and 54 has a front edge 53A, 54A which butts against the underside of the portion 25 of the respective finger. In this way the front edge of the front portion 41 provides a smooth edge butting against the underside of the guard with no spaces between the guard and the front edge of the wear shield thus preventing the penetration of soil or any possibility for obstacles entering into this area and ripping the wear shield from its mounted position.

The advantages of the arrangement described above are as follows:

1 The profile of the bottom surface of the wear shield promotes soil flow and eliminates soil build-up and friction, specifically where it mounts to the guard at the front edges which are clamped to the guard.

2. The wear shield is molded to follow the guard shape so that portions of the wear shield are located underneath the rear portion 25 of the fingers.

3. The wear shield is held in place only by the two guard bolts without any additional steel plates or other elements which must be removed or could wear. The wear shield is therefore easily and quickly removed simply by removing the guard bolts.

4. There is about 7 millimeters of interference between the wear shield and the bottom plate of the cutter bar which creates a tight fit at the junction between the wear shield and the bottom plate. This is achieved by the contact at the front between the front edge of the wear shield and the guard bar and the lifting effect of the bolt which pulls the rear edge of the wear shield upwardly against the bottom plate. The resilience of the wear shield provide a spring force loading the rear part of the wear shield against the bottom plate of the cutter bar.

The arrangement as shown provides only a single wear shield for each guard but it will be appreciated that the wear shield could be made in widths for multiple guards.

The guard bolts 26 are of a special design which has the double shoulder arrangement for clamping both the guard and the wear shield. The bolts have a longer square neck and additional round head.

Since various modifications can be made in my invention as herein above described, and many apparently widely different embodiments of same made within the spirit and scope of the claims without departure from such spirit and scope, it is intended that all matter contained in the accompanying specification shall be interpreted as illustrative only and not in a limiting sense.

The invention claimed is:

1. A header of a crop cutting machine comprising:
a cutter bar;
a guard bar mounted on a front edge of the cutter bar;
a plurality of cutter guards carried on mounting fasteners at spaced positions along the guard bar;
a ground engaging bottom plate on the cutter bar extending rearwardly from the guard bar;
and a wear shield covering the bottom plate such that the wear shield engages the ground underneath the bottom plate to protect the bottom plate from wear, the wear shield comprising:
a wear body molded from a plastic material;
the wear body having a front mounting portion and a rear covering portion;
the front mounting portion being shaped to define at least one mounting hole receiving therethrough the a mounting fastener of a respective one of the cutter guards such that the front mounting portion is attached to the guard bar by the mounting fastener which mounts the cutter guard;

the rear covering portion extending rearwardly from the front mounting portion such that an upper surface extends along the bottom plate to cover the bottom plate and having a bottom surface arranged for engaging the ground so as to underlie and protect the bottom plate;

the front mounting portion and the rear covering portion having two side edges each located alongside a side edge of a next adjacent wear shield so that the wear shields are arranged side by side across the cutter bar;

wherein the front mounting portion has upper surface portions arranged to lie in a common plane so as in use to butt against a bottom surface of the guard bar and wherein the front mounting portion has at least one recess therein recessed from the common plane and arranged to receive a portion of a respective one of the guards therein, which portion projects below the bottom surface of the guard bar.

2. The header according to claim 1 wherein the upper surface portions on each side of said at least one recess at the front edge thereof across the full width thereof lie in said common plane so as to butt against the bottom surface of the guard bar.

3. The header according to claim 1 wherein the front mounting portion has a front edge extending along a front edge of the guard bar substantially coincident therewith and clamped thereto by said mounting fastener.

4. The header according to claim 1 wherein the wear shield is resilient and a part or parts are arranged as interference fit with the cutter bar such that when fastened onto the guard bar at least a part of the upper surface portions is pressed by its own resilience causing spring loading against the bottom surface of the guard bar.

5. The header according to claim 1 wherein the front mounting portion has two recesses therein each arranged for receiving a respective one of two guard fingers of the respective one of the guards, two side pieces each extending outwardly to a respective side of a respective one of the recesses and a center piece between the two recesses, wherein the center piece includes a recess section extending thereacross for receiving a center bar of the guard.

6. The header according to claim 1 wherein the rear covering portion is cantilevered from the front mounting portion so that the molded wear body is only supported at the front mounting portion by the mounting fastener.

7. The header according to claim 1 wherein the rear covering portion includes an upper surface engaging the bottom plate and wherein the upper surface includes a plurality of downwardly extending recesses forming therebetween upwardly extending ribs defining an upper surface of the ribs engaging the cutter bar rearwardly of the guard bar and wherein the bottom surface arranged for engaging the ground is smooth so that the recesses and ribs are formed only in the upper surface.

8. A wear shield for attachment to a header of a crop culling machine having a cutter bar, a guard bar mounted on a front edge of the cutter bar, a plurality of cutter guards carried on mounting fasteners at spaced positions along the guard bar and a ground engaging bottom plate on the cutter bar extending rearwardly from the guard bar;

the wear shield comprising:

a wear body molded from a plastic material;

the wear body having a front mounting portion and a rear covering portion;

the front mounting portion being shaped to define at least one mounting hole therethrough arranged to receive therethrough a mounting fastener of a respective one of the cutter guards such that the front mounting portion is attached to the guard bar by the fastener which mounts the cutter guard;

the rear covering portion being arranged to extend rearwardly from the front mounting portion and having a bottom surface arranged for engaging the ground so as to underlie and protect the bottom plate;

the front mounting portion and the rear covering portion having two side edges each for locating alongside a side edge of a next adjacent wear shield so that the wear shields can be arranged side by side across the cutter bar;

wherein the front mounting portion has upper surface portions arranged to lie in a common plane so as in use to butt against a bottom surface of the guard bar and wherein the front mounting portion has at least one recess therein recessed from the common plane and arranged to receive a portion of a respective one of the guards therein, which portion projects below the bottom surface of the guard bar.

9. The wear shield according to claim 8 wherein the wear shield is resilient and a part or parts are arranged as interference fit with the cutter bar such that when fastened onto the guard bar by the mounting fastener at least a part of the upper surface portions is pressed by its own resilience causing spring loading against the bottom surface of the guard bar.

10. The wear shield according to claim 8 wherein the at least one recess has a bottom surface portion arranged to butt against a bottom surface of the portion of the respective one of the guards.

11. The wear shield according to claim 8 wherein the front mounting portion has two recesses therein each arranged for receiving a respective one of two guard fingers of the respective one of the guards, two side pieces each extending outwardly to a respective side of a respective one of the recesses and a center piece between the two recesses, wherein the center piece includes a recess section extending thereacross for receiving a center bar of the guard.

12. The wear shield according to claim 8 wherein the rear covering portion is cantilevered from the front mounting portion so that the molded wear body is only supported at the front mounting portion by the mounting fastener.

13. The wear shield according to claim 8 wherein the rear covering portion includes an upper surface engaging the bottom plate and wherein the upper surface includes a plurality of downwardly extending recesses forming therebetween upwardly extending ribs defining an upper surface of the ribs engaging the cutter bar rearwardly of the guard bar and wherein the bottom surface arranged for engaging the ground is smooth so that the recesses and ribs are formed only in the upper surface.

14. The wear shield according to claim 8 wherein the front mounting portion has a front edge arranged to extend along a front edge of the guard bar substantially coincident therewith.

15. The wear shield according to claim 8 wherein the mounting fastener includes a fastener head arrangement shaped and arranged to be located below the guard bar and a shank which passes through a hole in the guard bar and wherein the fastener head is shaped to define a first shoulder for engaging a bottom surface of the cutter guard so as to apply pressure from the shank directly against the cutter guard to clamp the cutter guard onto a bottom surface of the guard bar and a second shoulder axially spaced from the first shoulder for engaging a bottom surface of the front mounting portion so as to apply pressure against the front mounting portion to clamp the front mounting portion in place on the guard bar.

16. A wear shield
   for attachment to a header of a crop culling machine having a cutter bar, a guard bar mounted on a front edge of the cutter bar, a plurality of cutter guards at spaced positions along the guard bar and a ground engaging bottom plate on the cutter bar extending rearwardly from the guard bar;
   the wear shield comprising:
      a wear body molded from a plastic material;
      the wear body having a front mounting portion and a rear covering portion;
      the front mounting portion having at least one mounting hole therethrough arranged to receive therethrough a respective mounting fastener such that the front mounting portion is attached to the guard bar by the mounting fastener;
      the rear covering portion being arranged to extend rearwardly from the front mounting portion and having a bottom surface arranged for engaging the ground so as to underlie and protect the bottom plate;
      the front mounting portion and the rear covering portion having two side edges each for locating alongside a side edge of a next adjacent wear shield so that the wear shields can be arranged side by side across the cutter bar;
      wherein the front mounting portion has a front edge arranged to extend along a front edge of the guard bar substantially coincident therewith when clamped thereto by said mounting fastener;
      wherein the front mounting portion has upper surface portions arranged to lie in a common plane so as in use to buff against a bottom surface of the guard bar;
      wherein the front mounting portion has at least one recess in the upper surface portions arranged to receive a portion of a respective one of the guards therein;
      and wherein the upper surface portions on each side of said at least one recess at the front edge thereof across the full width thereof lie in said common plane so as to bull against the bottom surface of the guard bar.

17. The wear shield according to claim 16 wherein the wear shield is resilient and a part or parts are arranged as interference fit with the cutter bar such that when fastened onto the guard bar at least a part of the upper surface portions is pressed by its own resilience causing spring loading against the bottom surface of the guard bar.

18. The wear shield according to claim 16 wherein the front mounting portion has two recesses therein each arranged for receiving a respective one of two guard fingers of the respective one of the guards, two side pieces each extending outwardly to a respective side of a respective one of the recesses and a center piece between the two recesses, wherein the center piece includes a recess section extending thereacross for receiving a center bar of the guard.

19. The wear shield according to claim 16 wherein the rear covering portion is cantilevered from the front mounting portion so that the molded wear body is only supported at the front mounting portion by the mounting fastener.

20. The wear shield according to claim 16 wherein the rear covering portion includes an upper surface for engaging the bottom plate and wherein the upper surface includes a plurality of downwardly extending recesses forming therebetween upwardly extending ribs defining an upper surface of the ribs for engaging the cutter bar rearwardly of the guard bar and wherein the bottom surface arranged for engaging the ground is smooth so that the recesses and ribs are formed only in the upper surface.

21. A header of a crop cutting machine comprising:
   a guard bar mounted on a front edge of the cutter bar;
   a plurality of cutter guards carried on mounting fasteners at spaced positions along the guard bar;
   a ground engaging bottom plate on the cutter bar extending rearwardly from the guard bar;
   and a wear shield covering the bottom plate such that the wear shield engages the ground underneath the bottom plate to protect the bottom plate from wear, the wear shield comprising:
      a wear body molded from a plastic material;
      the wear body having a front mounting portion and a rear covering portion;
      the front mounting portion being shaped to define at least one mounting hole receiving therethrough the mounting fastener of a respective one of the cutter guards such that the front mounting portion is attached to the guard bar by the mounting fastener which mounts the cutter guard;
      the rear covering portion extending rearwardly from the front mounting portion such that an upper surface extends along the bottom plate to cover the bottom plate and having a bottom surface arranged for engaging the ground so as to underlie and protect the bottom plate;
      the front mounting portion and the rear covering portion having two side edges each located alongside a side edge of a next adjacent wear shield so that the wear shields are arranged side by side across the cutter bar,
   the cutter guard having at least one rear portion mounted on a bottom surface of the guard bar with the mounting fastener fastening the rear portion to a bottom surface of the guard bar;
   wherein the front mounting portion has upper surface portions arranged to lie in a common plane so as in use to butt against a bottom surface of the guard bar and wherein the front mounting portion has at least one recess therein recessed from the common Diane and arranged to receive the rear portion of a respective one of the guards therein;
   wherein the mounting fastener includes a fastener head arrangement located below the guard bar and a shank which passes through a hole in said rear portion and through the guard bar and wherein the fastener head has a first shoulder engaging a bottom surface of the rear portion of the cutter guard so as to apply pressure from the shank directly against the rear portion of the cutter guard to clamp the cutter guard onto the bottom surface of the guard bar and a second shoulder axially spaced from the first shoulder engaging a bottom surface of the front mounting portion so as to apply pressure against the front mounting portion to clamp the front mounting portion in place on the guard bar.

22. The header according to claim 21 wherein the upper surface portions on each side of said at least one recess at the front edge thereof across the full width thereof lie in said common plane so as to butt against the bottom surface of the guard bar.

23. The header according to claim 21 wherein the front mounting portion has a front edge extending along a front edge of the guard bar substantially coincident therewith and clamped thereto by said mounting fastener.

24. The header according to claim 21 wherein the wear shield is resilient and a part or parts are arranged as interference fit with the cutter bar such that when fastened onto the guard bar at least a part of the upper surface portions is pressed by its own resilience causing spring loading against the bottom surface of the guard bar.

25. The header according to claim 21 wherein the front mounting portion has two recesses therein each arranged for receiving a respective one of two guard fingers of the respective one of the guards, two side pieces each extending outwardly to a respective side of a respective one of the recesses and a center piece between the two recesses, wherein the center piece includes a recess section extending thereacross for receiving a center bar of the guard.

26. The header according to claim 21 wherein the rear covering portion is cantilevered from the front mounting portion so that the molded wear body is only supported at the front mounting portion by the mounting fastener.

27. The header according to claim 21 wherein the rear covering portion includes an upper surface engaging the bottom plate and wherein the upper surface includes a plurality of downwardly extending recesses forming therebetween upwardly extending ribs defining an upper surface of the ribs engaging the cutter bar rearwardly of the guard bar and wherein the bottom surface arranged for engaging the ground is smooth so that the recesses and ribs are formed only in the upper surface.

* * * * *